Nov. 26, 1929.  M. BOCCHINO  1,737,406
CLOTHESLINE TIGHTENER
Filed Jan. 28, 1928
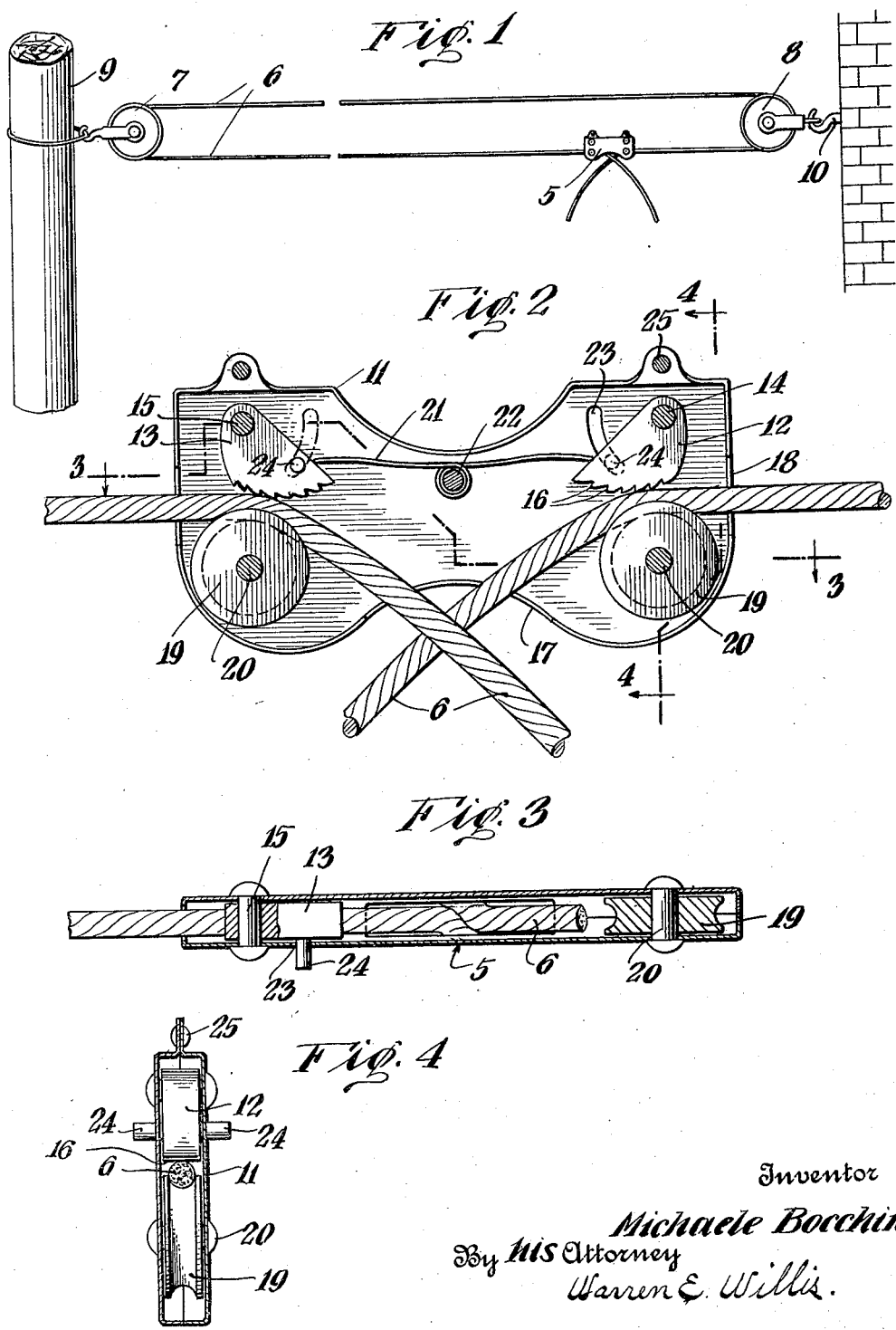
Inventor
*Michaele Bocchino*
By his Attorney
*Warren E. Willis.*

Patented Nov. 26, 1929

1,737,406

UNITED STATES PATENT OFFICE

MICHAEL BOCCHINO, OF PASSAIC, NEW JERSEY

CLOTHESLINE TIGHTENER

Application filed January 28, 1928. Serial No. 250,150.

This invention relates to line tightening devices, such for instance as are used for supporting laundered articles while airing or drying, and more particularly to devices for adjusting the length of a line passed over spaced apart pulleys, whereby a suitable taut condition is attained.

As it is well known such wash lines are disposed around two pulleys, one ordinarily being attached to a building, near a door or window and the other to a rigid pole set at some distance away, the pulleys often being at a considerable distance from the ground, not readily accessible, the line being used to pin on articles and then pulled to present a clear space for other articles until they have all been hung upon it.

It is also known that such lines shrink and expand, due to moisture in the air and changes in temperature, frequently requiring length adjustment.

It is therefore an object of the present invention to provide a thin hollow block into which the opposite ends of a line may be entered and drawn to any degree of tightness desired, means being provided in the block to normally prevent either end of the line from becoming loosened.

A further feature is in the provision of means for releasing either end of the line selectively at will without loosening the other end.

Another purpose is to produce a line tightener which completely avoids any occasion to tie knots in the line or to provide fastenings of any sort whatever, thereby preventing injury to the line and rendering it readily adjustable by persons without previous experience.

These and other advantageous objects are accomplished by the novel and practical construction and combination of parts hereinafter described and illustrated in the accompanying drawing, constituting a material component of this disclosure, and in which:—

Figure 1 is a general view showing the device applied to a conventional clothes line.

Figure 2 is an enlarged side view of one of the casing sides showing the elements carried thereby.

Figure 3 is a sectional view taken along the line 3—3 of Figure 2, the casing sides being united.

Figure 4 is a transverse sectional view taken on the line 4—4 of Figure 2.

Referring to the drawings, Figure 1, the device, generally indicated as 5, is shown in operation on a line 6, which passes over pulleys 7 and 8, one being suitably mounted on a pole 9 and the other on a hook 10 set in a wall contiguous to an opening, as a door or window.

In Figure 2, the tightening device is shown to comprise a sheet-metal casing 11, made in two equal opposed sections, in which are gripping members 12—13 provided with serrations 16, inclined in such direction that they will grip the line 6 only when the latter is pulled inwardly, as through a side aperture 17 in the casing 11.

The line 6 passes through apertures 18 in the ends of the casing, and thence over small grooved pulleys 19, pivotally mounted on shouldered rivets 20, and so positioned relative to the gripping member 12—13 that the space therebetween is insufficient to allow the free passage of the line when pulled outwardly through the apertures 18.

The gripping members 12—13 are so mounted that they will be forced by gravity into operative position, but in order to insure such a position, a spring 21 may be provided to press downwardly at its free ends upon the upper edges of the gripping members, the double leaf spring 21 shown being held in operative position by a rivet 22.

The casing 11 is provided with arcuate slots 23 which accommodate pins 24, the latter being fixed rigidly in the gripping members and serve as means to raise the gripping members from engagement with the line 6 when it is desired to loosen the line.

As shown in Figure 4, the casing 11 is formed of two similar sections which are joined by rivets 25 in addition to the rivets 20 passing through the pulleys.

In operation, when it is desired to tighten the line, it is pulled through aperture 17 until the desired tension is obtained, and the one-way gripping members 12—13 will hold the line in the tightened position. When it is desired to loosen the line, the operator raises the gripping members, by means of the pins 24, movable in the slots 23 and the line is allowed to move freely outward in either direction through the tightening device.

From the above description it will be seen that a simple and inexpensive tightening device is provided, which will enable the saving of much time and energy in the process of drying clothing upon lines of the type shown.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:—

1. A line tightening device comprising a casing, a pair of one-way gripping members pivotally mounted therein in opposed relation and normally in contact with the opposed ends of a line to be tightened, a pair of pulleys pivotally mounted in the casing and spaced from the gripping members a distance sufficient to permit the passage of a line, and means for raising the gripping members when it is desired to loosen the line from either side of said casings.

2. A line tightening device comprising a casing having opposed arcuate slots, a pair of one-way gripping members pivotally mounted therein and normally forced downwardly into contact with a line, a pair of pulleys pivotally mounted adjacent the gripping members and over which the line passes, and pins fixed to the gripping members to raise them when it is desired to loosen the line, said pins extending through the slots, and said casing being provided with apertures in its ends and bottom through which the line passes.

3. A line tightening device comprising a sheet metal casing formed of two similar sections, a pair of gripping members pivotally mounted therein, said members having teeth so arranged that they will grip a line only in one direction, a pair of pulleys pivotally mounted in the casing and positioned from the gripping members so that there is just sufficient space for a line to pass therebetween, spring means for normally forcing the gripping members against a line, and means for raising the gripping members to an inoperative position when it is desired to loosen the line.

In testimony whereof I affix my signature.

MICHAEL BOCCHINO.